United States Patent
Harries et al.

(10) Patent No.: US 12,330,509 B2
(45) Date of Patent: Jun. 17, 2025

(54) SYSTEMS AND METHODS FOR RESOLVING HILL START CONDITIONS

(71) Applicant: Rivian IP Holdings, LLC, Plymouth, MI (US)

(72) Inventors: Brian Harries, Hermosa Beach, CA (US); Boru Wang, Torrance, CA (US); Kang Wang, Palos Verdes Estates, CA (US); Chia-Chou Yeh, Torrance, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 1117 days.

(21) Appl. No.: 17/159,224

(22) Filed: Jan. 27, 2021

(65) Prior Publication Data

US 2022/0234452 A1 Jul. 28, 2022

(51) Int. Cl.
*B60L 15/20* (2006.01)
*B60L 53/20* (2019.01)

(52) U.S. Cl.
CPC .......... *B60L 15/2081* (2013.01); *B60L 53/20* (2019.02); *B60L 2240/10* (2013.01); *B60L 2250/26* (2013.01)

(58) Field of Classification Search
CPC ............ B60L 15/2081; B60L 2240/10; B60L 2250/26
USPC ........................................................... 701/22
See application file for complete search history.

(56) References Cited

U.S. PATENT DOCUMENTS

| 6,124,645 A | * | 9/2000 | Jones .................. B60L 15/2009 290/22 |
| 2004/0263099 A1 | * | 12/2004 | Maslov .................. B60L 50/20 318/400.24 |
| 2015/0081150 A1 | * | 3/2015 | Wolff .................. B60L 15/2018 903/902 |
| 2016/0082969 A1 | * | 3/2016 | Jang ......................... B60L 3/12 477/7 |
| 2020/0216056 A1 | | 7/2020 | Sevel et al. |

FOREIGN PATENT DOCUMENTS

| CN | 105711590 A | 6/2016 |
| CN | 110979301 A | 4/2020 |
| CN | 111516667 A | 8/2020 |

OTHER PUBLICATIONS

First Office Action on CN 202111285696.3 dated Feb. 14, 2025.

* cited by examiner

*Primary Examiner* — Jacob S. Scott
*Assistant Examiner* — Michael E Butler
(74) *Attorney, Agent, or Firm* — Foley & Lardner LLP

(57) ABSTRACT

Various disclosed embodiments include illustrative systems for performing hill stall/start assist functions. An illustrative drive unit controller receives a zero-speed command and electric motor information, generates a torque command based on the received zero-speed command and the electric motor information, and instructs a drive unit inverter for an electric motor in response to the generated torque command.

17 Claims, 4 Drawing Sheets

SYSTEMS AND METHODS FOR RESOLVING HILL START CONDITIONS

INTRODUCTION

The present disclosure relates to hill start/stall assist systems.

As shown in FIG. 1, when starting a vehicle from a stationary position on a steep incline a driver has to coordinate the application and release of the clutch, brake, and accelerator pedals in a manual transmission car. Improper application may cause the vehicle to roll back in a hill ascent situation or the vehicle to roll forward in a hill descent situation.

Most hill-hold systems used in vehicles today come in various categories. These categories use some form of automatic braking or control of engine torque in order to maintain a hill hold condition before being commanded to accelerate from a hill hold.

BRIEF SUMMARY

Various disclosed embodiments include illustrative controllers, drive units, and vehicles.

In an illustrative embodiment, a drive unit controller includes a first component that is configured to receive a zero-speed command and electric motor information and a second component that is configured to generate a torque command based on the received zero-speed command and the electric motor information. The drive unit controller includes a third component that configured to instruct a drive unit inverter for an electric motor in response to the generated torque command.

In another illustrative embodiment, an illustrative drive unit includes an electric motor, a motor position sensor that is configured to generate information of the electric motor, an inverter that is configured to control operation of the electric motor, and a controller. The controller includes a first component that is configured to receive a zero-speed command and electric motor information, a second component that is configured to generate a torque command based on the received zero-speed command and the electric motor information, and a third component that is configured to instruct a drive unit inverter for an electric motor in response to the generated torque command.

In another illustrative embodiment, an illustrative vehicle includes a status unit that is configured to generate vehicle status information, a brake system that is configured to generate brake information, an acceleration system, and a drive unit. The acceleration system is configured to generate a zero-speed command responsive to the vehicle status information and the brake information and generate a first torque command responsive to acceleration pedal information. The drive unit includes an electric motor, a motor position sensor that is configured to generate information of the electric motor, an inverter that is configured to control operation of the electric motor, and a controller. The controller includes a first component that is configured to receive the zero-speed command and the electric motor information, a second component that is configured to generate a second torque command based on the received zero-speed command and electric motor information, and a third component that is configured to instruct a drive unit inverter for an electric motor in response to the generated second torque command.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
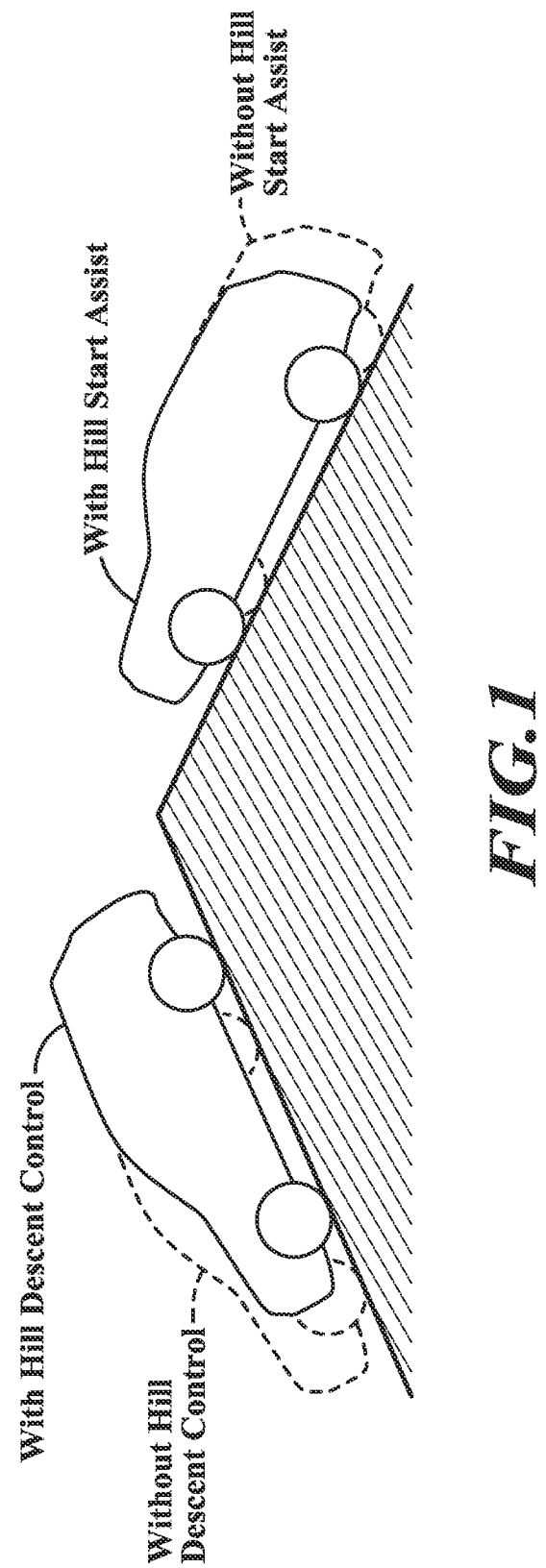
FIG. 1 is an illustration of a vehicle in different hill start scenarios according to the prior art.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative controllers, drive units, and vehicles.

Figure 2:
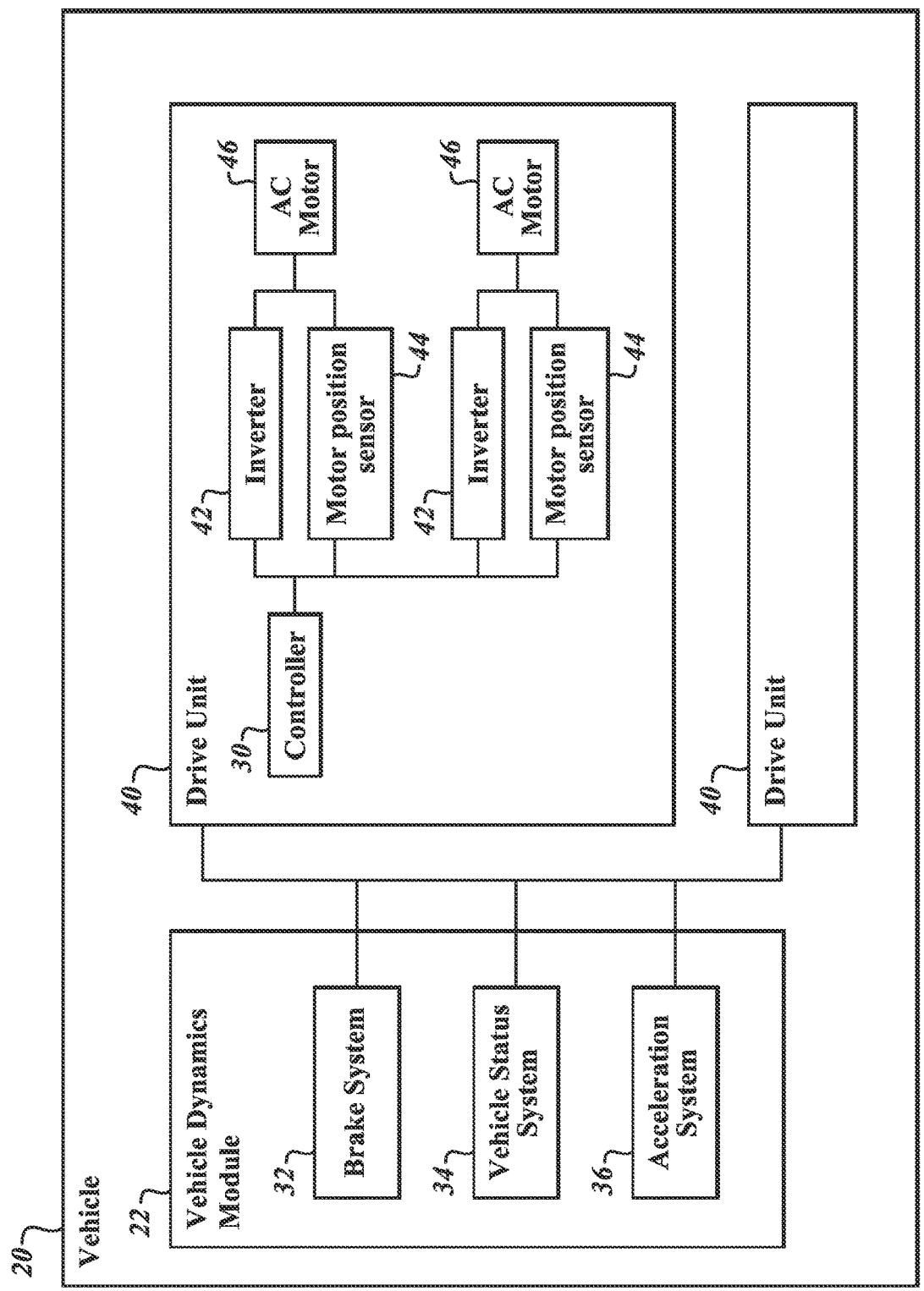
FIG. 2 is a block diagram of an illustrative electric vehicle with an illustrative hill start assist system.

Referring now to FIG. 2 and given by way of overview, in various embodiments an illustrative vehicle 20 includes components for using electric motor speed control in order to assist during hill start/stall assist situations.

In various embodiments, the vehicle 20 includes one or more drive units 40 that may be in communication with a brake system 32, a vehicle status system 34, and an acceleration system 36 that are included in a vehicle dynamics module 22. In various embodiments, the drive unit 40 may be a dual-inverter drive unit as shown or may include other configurations, such as single controller drive units. In various embodiments, the drive unit 40 includes a controller 30, a pair of inverters 42, a pair of motor position sensors (e.g., encoders, resolvers) 44, and a pair of alternating current (AC) motors 46.

A first one of the inverters 42 provides a 3-phase current motor drive signal, which includes a voltage vector value and a voltage magnitude value, to a first one of the AC motors 46. A second one of the inverters 42 provides a 3-phase current motor drive signal to the second one of the AC motors 46. Attached to each of the AC motors 46 are the motor position sensors 44. The motor position sensors 44 generate a motor position information for each of the respective AC motors 46.

In a hill start/stall assist (HSA) speed control mode, the acceleration system 36 sends a zero-speed command to the controller 30 which generates a torque command in response to the zero-speed command and the motor position information received from the motor position sensors 44. The controller 30 instructs the inverters 42 to output phase voltage signals to the motors 46 in response to the torque command.

As shown in FIG. 2, an optional additional drive unit 40 may be used for an all-wheel powered vehicle. The following operational description is applicable to vehicles that include multiple drive units.

In various embodiments, the controller 30 receives signals from the brake system 32, the vehicle status system 34, and the acceleration system 36. The controller 30, the vehicle status system 34, or the acceleration system 36 determines whether the vehicle 20 is in a hill start condition based on the received signals. The controller 30, the vehicle status system 34, or the acceleration system 36 determines that the vehicle 20 is in a HSA condition in response to the received signals indicating an On vehicle state, a brake pedal of the brake system 32 being depressed by less than a threshold amount, and the vehicle speed being below a threshold amount. After the HSA condition has been determined, the controller 30, the vehicle status system 34, or the acceleration system 36 begins a speed control mode of the HSA. The controller 30, the vehicle status system 34, or the acceleration system 36 may also determine the HSA condition using data from other sources such as, for example, slope or grade information as well as motor position information.

In the speed control mode HSA, the controller 30 generates a torque command based on a zero-speed command received from the acceleration system and the motor position information. The controller 30 receives motor position information from the motor position sensors 44.

Also, the acceleration system 36 generates torque commands as an operator of the vehicle 20 depresses an acceleration pedal of the acceleration system 36 (or as a control system of an autonomous vehicle causes an acceleration pedal of the acceleration system 36 to be depressed). In response to the controller 30 receiving the torque command from the acceleration system 36, the controller 30 compares the torque command received from the acceleration system 36 to the torque command generated by the controller 30. If the torque command from the acceleration system 36 is determined to be greater than the torque command generated by the controller 30, the controller 30 instructs the inverter 42 to operate according to the torque command received from the acceleration system 36. The result is that when the vehicle 20 is stopped on a slope and the user reduces brake pressure, the vehicle 20 will maintain its position (i.e., not roll forward or roll backwards) until the acceleration pedal is depressed (i.e., acceleration system torque command) greater than a threshold amount. After the threshold amount of the acceleration pedal has been applied, the vehicle 20 accelerates from that stopped position by disabling the speed HSA.

In various embodiments, the vehicle 20 enters a torque control mode HSA condition after receiving vehicle speed information, brake status information, and vehicle pitch and/or slope grade information. If the pitch or slope grade information is greater than the threshold amount and the brake pedal is not depressed by more than a threshold amount relative to the pitch/slope grade information, then the acceleration system 36 generates a torque command. In some embodiments, the torque command is sent to the controller 30, which controls the inverter 42. The inverters 42 generate control signals for the AC motors 46. In some other embodiments, the torque signal is sent back to the brake system 32 for the automatic application of the brakes in order to keep the vehicle from rolling in a hill start/stall scenario.

While the vehicle 20 is operating in the torque control mode HSA, the controller 30 receives position information of the AC motors 46 from the motor position sensor 44 and generates a torque command in response to the motor position information and a zero-speed command received from the acceleration system 36. The controller 30 checks to verify accuracy of the torque command from the acceleration system 36 by comparing it to the torque command generated by the controller 30.

If there is no significant difference between the torque commands, then the process of using the torque command from the acceleration system 36 continues. If, however, the comparison between the torque commands indicate a significant difference, then an anomaly is noted by the controller 30, the acceleration system 36, or the vehicle status system 34. In various embodiments if the comparison between the torque commands is significantly different, then the controller 30, the acceleration system 36, or the vehicle status system 34 may decide to use the torque command from the controller 30.

Figure 3:
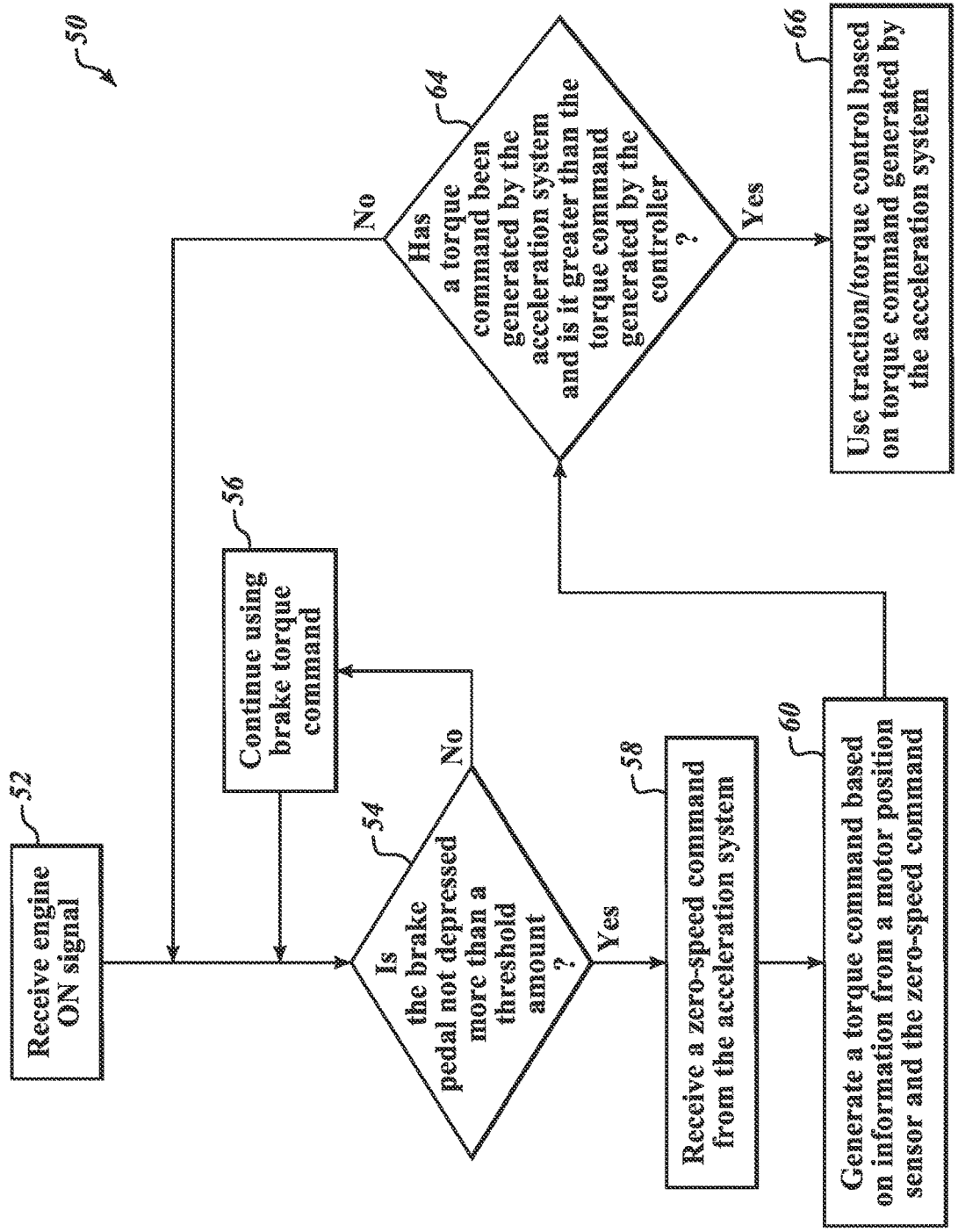
FIG. 3 is a flow chart of an illustrative method performed by the hill start assist system of FIG. 2.

Referring additionally to FIG. 3, in various embodiments an illustrative process 50 is performed by a drive unit controller. At a block 52, a determination is made if a hill start/stall assist function exists upon receiving a vehicle On signal. Next at a block 54, based on brake pedal information received from a brake pedal system, the drive unit controller determines whether the brake pedal information indicates that the brake pedal is depressed by a more than a threshold amount. The threshold amount would be an amount of brake pedal depression that would keep the vehicle 20 from rolling forward or backward. This brake pedal threshold amount may be a predetermined static value or may be dynamically calculated based on other information, such as slope grade or vehicle pitch information, received by the drive unit controller 30, the acceleration system 36, or the vehicle status system 34.

If the drive unit controller 30, the acceleration system 36, or the vehicle status system 34 determines that the brake pedal has been depressed more than the threshold amount, then the process 50 continues analyzing the brake pedal status. If the drive unit controller 30, the acceleration system 36, or the vehicle status system 34 determines that the brake pedal has been depressed less than the threshold amount and current vehicle speed or motor speed information indicates a speed value below a threshold amount, then at a block 58, the acceleration system 36 sends a zero-speed command to the controller 30. At a block 60, the drive unit controller 30 generates a torque command in order to keep the vehicle 20 at zero speed. The controller 30 instructs the drive unit inverters 42 to send drive signals to the drive unit motors 46 in response to the generated torque command and motor position information.

Figure 4:
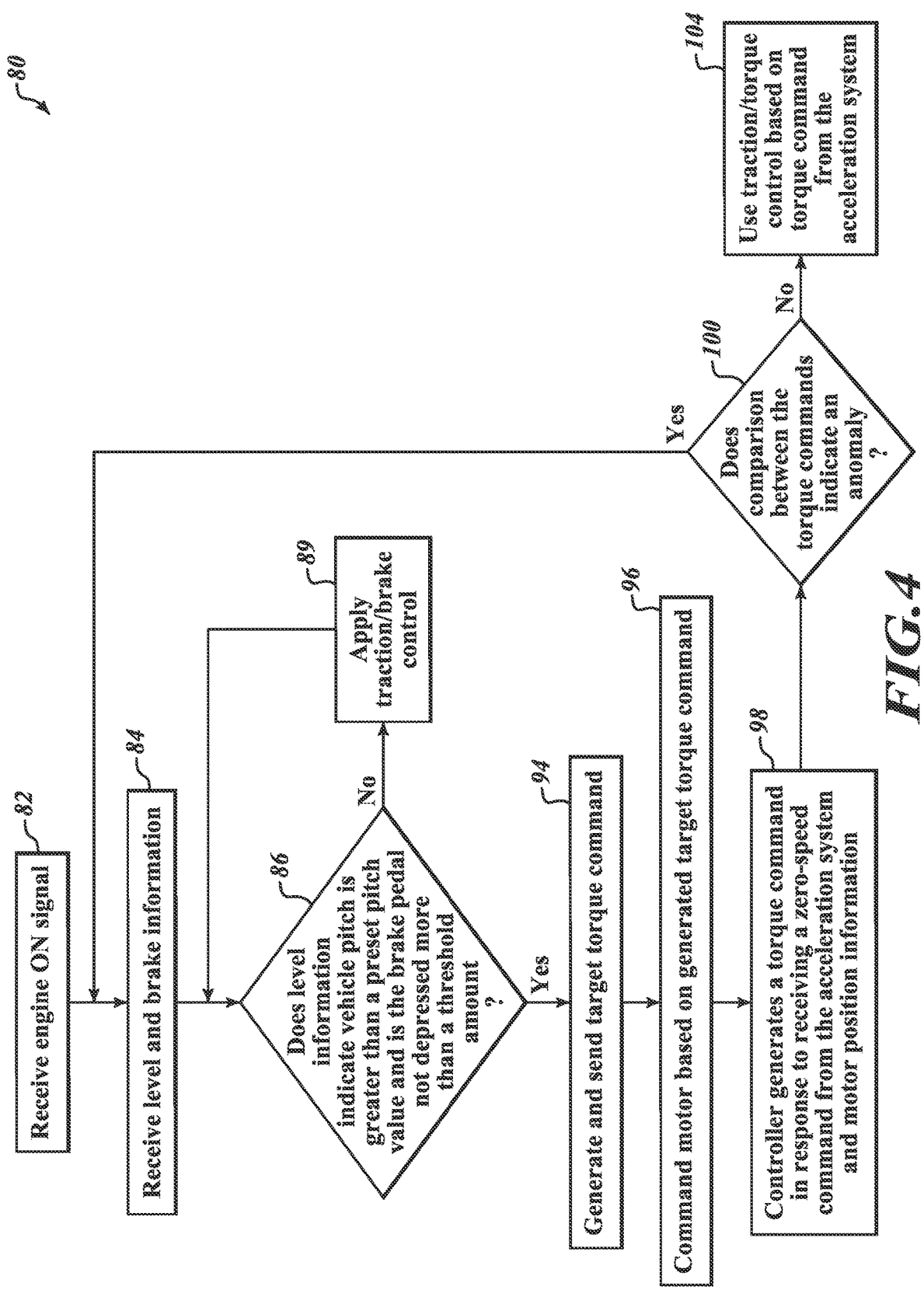
FIG. 4 is a flow chart of an illustrative method for analyzing/diagnosing a traditional hill start assist system.

Referring additionally to FIG. 4, in various embodiments an illustrative process 80 is performed by the vehicle 20. At a block 82, the vehicle status 34 checks if a HSA condition exists upon receiving a vehicle On signal. Next, at a block 84, level (that is, pitch or slope grade information) and brake information (for example, brake pedal depression value) are received by the vehicle status system 34. At a decision block 88, the vehicle status system 34 determines whether the level information indicates that vehicle pitch/slope grade is greater than a preset value and whether the brake information indicates that the brake pedal is not being depressed by more than a threshold amount. This decision step is an example of a traditional HSA system. It will be appreciated that any suitable HSA system may be used as desired for a particular application.

In response to the conditions of the decision block 88 being met, in various embodiments the acceleration system 36 generates a target torque command at block 94 and sends it and a zero-speed command to the controller 30. At a block 96, the controller 30 controls the motors 46 based on the target torque command by instructing the inverters 42. At a block 98, the controller 30 determines a torque command in response to the received zero-speed command using motor position information received from an associated drive unit motor position sensor. The controller-determined torque command is compared to the target torque command. If at a decision block 100, the comparison indicates that the controller-determined torque command and the target torque command are significantly different, then a possible error is indicated. The error may get reported or the vehicle status system 34, the acceleration system 36 or the controller 30 may decide to switch to an alternate HSA process, such as that shown in FIG. 3. If no significant differences between the controller-determined torque command and the target torque command exist, then at a block 104 no error is reported and the process 80 continues using the generated target torque command.

From the foregoing discussion and associated drawing figures, it will be appreciated that various embodiments have been disclosed and illustrated. To that end and without any implication of any limitation (which is not to be inferred), the following paragraphs set forth non-limiting summaries of various embodiments disclosed herein by way of example only and not of limitation:

A. A controller comprising: a first component configured to receive a zero-speed command and electric motor information; a second component configured to generate a torque command based on the received zero-speed command and the electric motor information; and a third component configured to instruct a drive unit inverter for an electric motor in response to the generated torque command.

B. The controller of A, wherein the electric motor information includes motor position information.

C. The controller of B, wherein the controller is further configured to receive a torque command generated by an acceleration system.

D. The controller of C, wherein the third component instructs the drive unit inverter based on the torque command generated by the acceleration system, if the torque command generated by the second component is less than the torque command generated by the acceleration system.

E. The controller of D, wherein the third component instructs the drive unit inverter based on the torque command generated by the second component, if the torque command generated by the second component is greater than the torque command generated by the acceleration system.

F. The controller of C, wherein the received zero-speed command is based on pitch information of an associated vehicle.

G. The controller of F, wherein the torque command generated by an acceleration system is responsive to the pitch information being greater than a pitch threshold amount.

H. A drive unit comprising: an electric motor; a motor position sensor configured to generate information of the electric motor; an inverter configured to control operation of the electric motor; and a controller including: a first component configured to receive a zero-speed command and electric motor information; a second component configured to generate a torque command based on the received zero-speed command and the electric motor information; and a third component configured to instruct a drive unit inverter for an electric motor in response to the generated torque command.

I. The drive unit of H, wherein the electric motor information includes motor position information.

J. The drive unit of I, wherein the controller is further configured to receive a torque command generated by an acceleration system.

K. The drive unit of J, wherein the third component instructs the drive unit inverter based on the torque command generated by the acceleration system, if the torque command generated by the second component is less than the torque command generated by the acceleration system.

L. The drive unit of K, wherein the third component instructs the drive unit inverter based on the torque command generated by the second component, if the torque command generated by the second component is greater than the torque command generated by the acceleration system.

M. The drive unit of H, wherein the torque command generated by the acceleration system is based on pitch information of an associated vehicle.

N. The drive unit of M, wherein the torque command generated by an acceleration system is responsive to the pitch information being greater than a pitch threshold amount.

O. A vehicle comprising: a status unit configured to generate vehicle status information; a brake system configured to generate brake information; an acceleration system configured to generate a zero-speed command responsive to the vehicle status information and the brake information and generate a first torque command responsive to acceleration pedal information; and a drive unit including: an electric motor; a motor position sensor configured to generate information of the electric motor; an inverter configured to control operation of the electric motor; and a controller including: a first component configured to receive the zero-speed command and the electric motor information; a second component configured to generate a second torque command based on the received zero-speed command and electric motor information; and a third component configured to instruct a drive unit inverter for an electric motor in response to the generated second torque command.

P. The vehicle of O, wherein: the vehicle status information includes information includes vehicle activation information; the brake information includes status information of a brake pedal of the vehicle; and the electric motor information includes motor position information.

Q. The vehicle of P, wherein the third component instructs the drive unit inverter based on the torque command generated by the acceleration system, if the torque command generated by the second component is less than the torque command generated by the acceleration system.

R. The vehicle of O, wherein the third component instructs the drive unit inverter based on the torque command generated by the second component, if the torque command generated by the second component is greater than the torque command generated by the acceleration system.

S. The vehicle of O, wherein: the vehicle status information includes pitch information of an associated vehicle; and the first torque command is further based on the pitch information.

T. The vehicle of O, wherein the status unit, the brake system, and the acceleration system are included in a vehicle dynamics module.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A controller comprising:
    a first component configured to receive a zero-speed command and electric motor information comprising information on positions of a plurality of electric motors received from a plurality of sensors for monitoring positions of the plurality of electric motors;
    a second component configured to generate a torque command based on the received zero-speed command and the information on positions of the plurality of electric motors of the electric motor information; and
    a third component configured to instruct a drive unit inverter for an electric motor in response to the generated torque command, wherein the controller is configured to:
        determine that a brake pedal is depressed less than a first threshold amount that is sufficient to keep the vehicle from rolling forward or backward and that a current motor speed information indicates a value below a second threshold amount for speed of the electric motor; and
        send, responsive to the determination, the zero-speed command to the first component.

2. The controller of claim 1, wherein the controller is further configured to receive a torque command generated by an acceleration system.

3. The controller of claim 2, wherein the third component instructs the drive unit inverter based on the torque command generated by the acceleration system, if the torque command generated by the second component is less than the torque command generated by the acceleration system.

4. The controller of claim 3, wherein the third component instructs the drive unit inverter based on the torque command generated by the second component, if the torque command generated by the second component is greater than the torque command generated by the acceleration system.

5. The controller of claim 2, wherein the received zero-speed command is based on pitch information of an associated vehicle.

6. The controller of claim 5, wherein the torque command generated by an acceleration system is responsive to the pitch information being greater than a pitch threshold amount.

7. A drive unit comprising: an electric motor;
    a motor position sensor configured to generate information of the electric motor;
    an inverter configured to control operation of the electric motor; and
    a controller including:
        a first component configured to receive a zero-speed command and electric motor information comprising information on positions of a plurality of electric motors received from a plurality of sensors for monitoring positions of the plurality of electric motors;
        a second component configured to generate a torque command based on the received zero-speed command and the information on positions of the plurality of electric motors of the electric motor information; and a third component configured to instruct a drive unit inverter for an electric motor in response to the generated torque command, wherein the controller is configured to:

determine that a brake pedal is depressed less than a first threshold amount that is sufficient to keep the vehicle from rolling forward or backward and that a current motor speed information indicates a value below a second threshold amount for speed of the electric motor; and send, responsive to the determination, the zero-speed command to the first component.

8. The drive unit of claim 7, wherein the controller is further configured to receive a torque command generated by an acceleration system.

9. The drive unit of claim 8, wherein the third component instructs the drive unit inverter based on the torque command generated by the acceleration system, if the torque command generated by the second component is less than the torque command generated by the acceleration system.

10. The drive unit of claim 9, wherein the third component instructs the drive unit inverter based on the torque command generated by the second component, if the torque command generated by the second component is greater than the torque command generated by the acceleration system.

11. The drive unit of claim 7, wherein the torque command generated by the acceleration system is based on pitch information of an associated vehicle.

12. The drive unit of claim 11, wherein the torque command generated by an acceleration system is responsive to the pitch information being greater than a pitch threshold amount.

13. A vehicle comprising:
a status unit configured to generate vehicle status information;
a brake system configured to generate brake information;
an acceleration system configured to generate a zero-speed command responsive to the vehicle status information and the brake information and generate a first torque command responsive to acceleration pedal information; and
a drive unit including:
an electric motor;
a motor position sensor configured to generate information of the electric motor; an inverter configured to control operation of the electric motor; and
a controller including:
a first component configured to receive the zero-speed command and the electric motor information comprising information on positions of a plurality of electric motors received from a plurality of sensors for monitoring positions of the plurality of electric motors;
a second component configured to generate a second torque command based on the received zero-speed command and information on positions of the plurality of electric motors of the electric motor information; and
a third component configured to instruct a drive unit inverter for an electric motor in response to the generated second torque command, wherein:
the vehicle status information includes information includes vehicle activation information; and
the brake information includes status information of a brake pedal of the vehicle; and the controller is further configured to determine that a brake pedal is depressed less than a first threshold amount that is sufficient to keep the vehicle from rolling forward or backward and that a current motor speed information indicates a value below a second threshold amount for speed of the electric motor and send, responsive to the determination, the zero-speed command to the first component.

14. The vehicle of claim 13, wherein the third component instructs the drive unit inverter based on the torque command generated by the acceleration system, if the torque command generated by the second component is less than the torque command generated by the acceleration system.

15. The vehicle of claim 13, wherein the third component instructs the drive unit inverter based on the torque command generated by the second component, if the torque command generated by the second component is greater than the torque command generated by the acceleration system.

16. The vehicle of claim 13, wherein:
the vehicle status information includes pitch information of an associated vehicle; and the first torque command is further based on the pitch information.

17. The vehicle of claim 15, wherein the status unit, the brake system, and the acceleration system are included in a vehicle dynamics module.

* * * * *